Jan. 22, 1924.
W. W. NUGENT
OIL PURIFYING MECHANISM
Filed Feb. 23, 1918
1,481,525
3 Sheets-Sheet 1
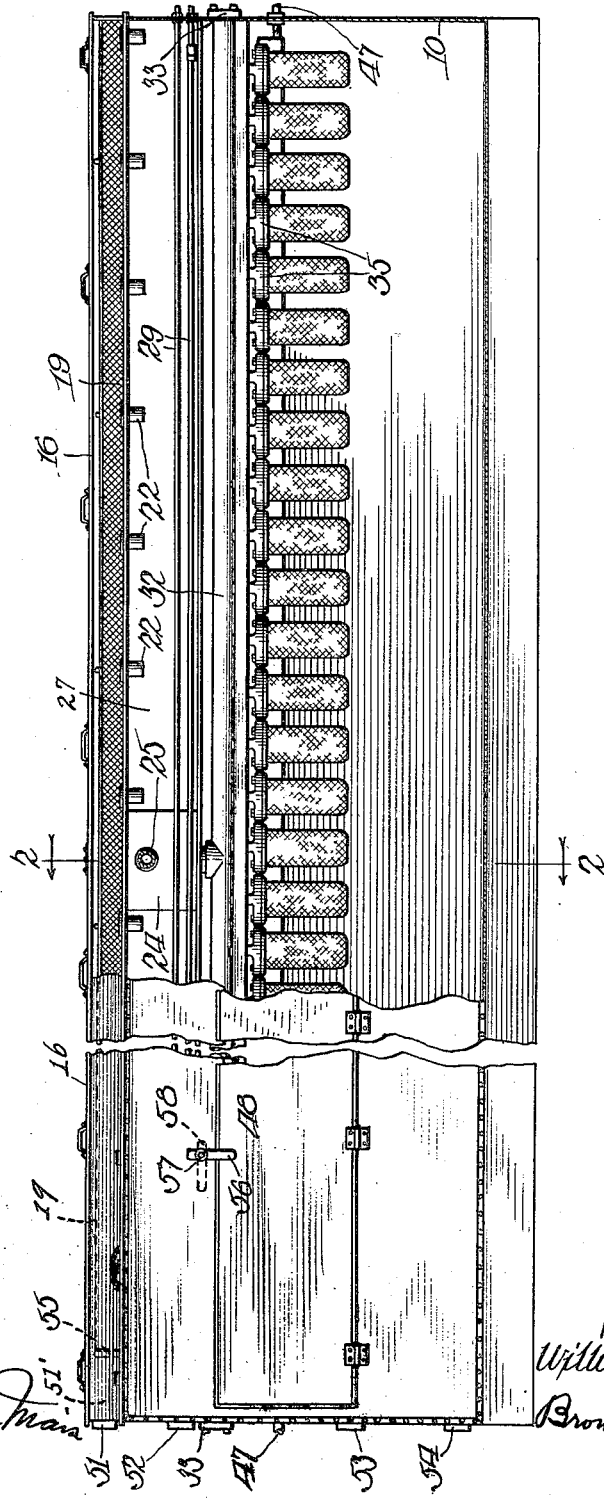
WITNESS
INVENTOR
William W. Nugent.
Brown & Nissen
ATTORNEYS Jan. 22, 1924.
W. W. NUGENT
OIL PURIFYING MECHANISM
Filed Feb. 23, 1918
1,481,525
3 Sheets-Sheet 2
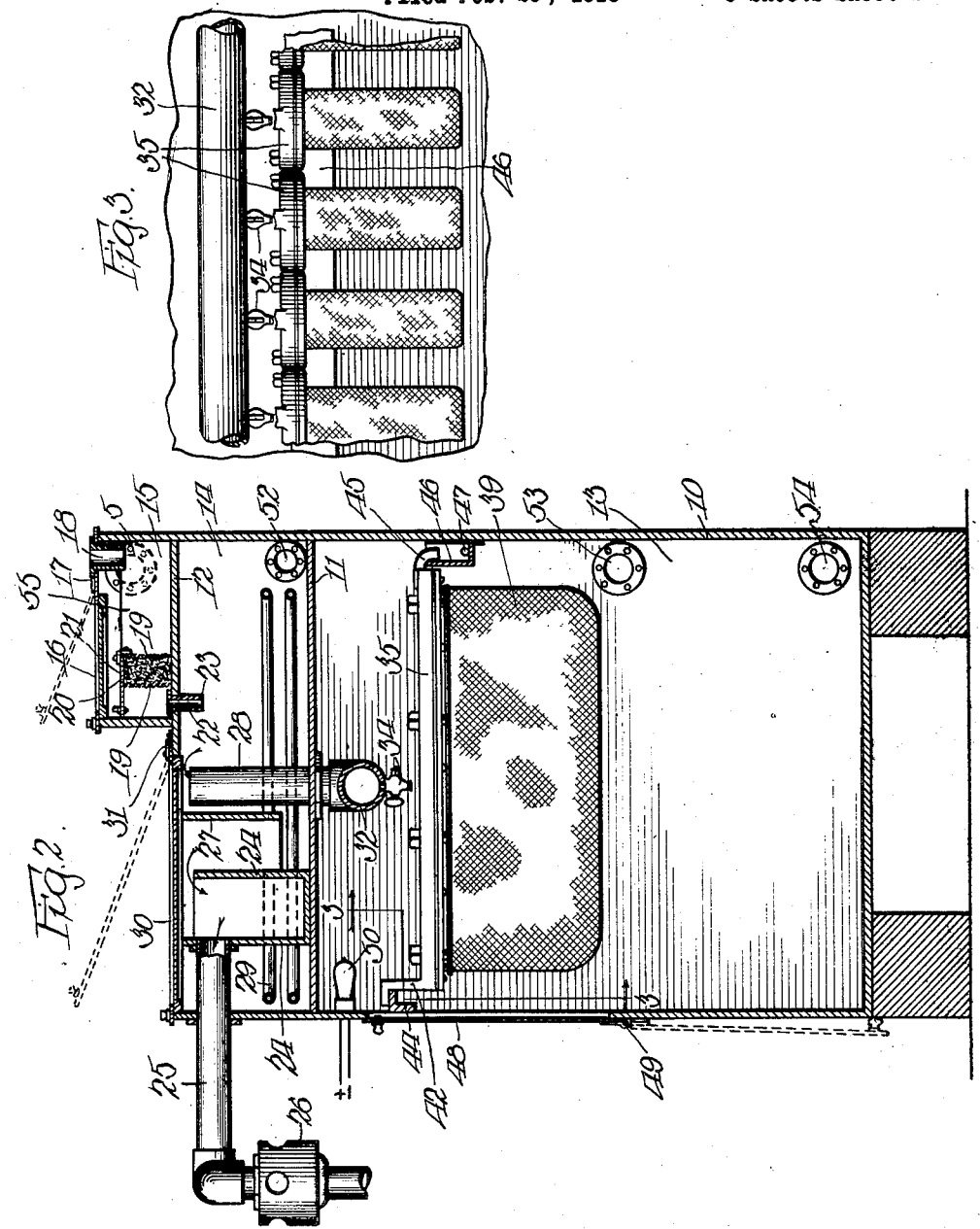
WITNESS
INVENTOR
William W. Nugent
BY
Brown & Nissen
ATTORNEYS

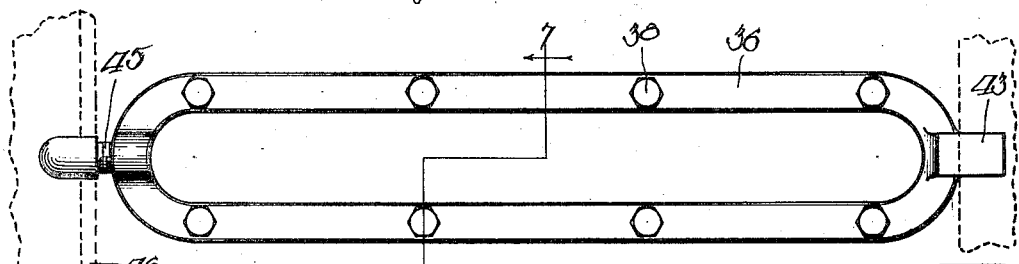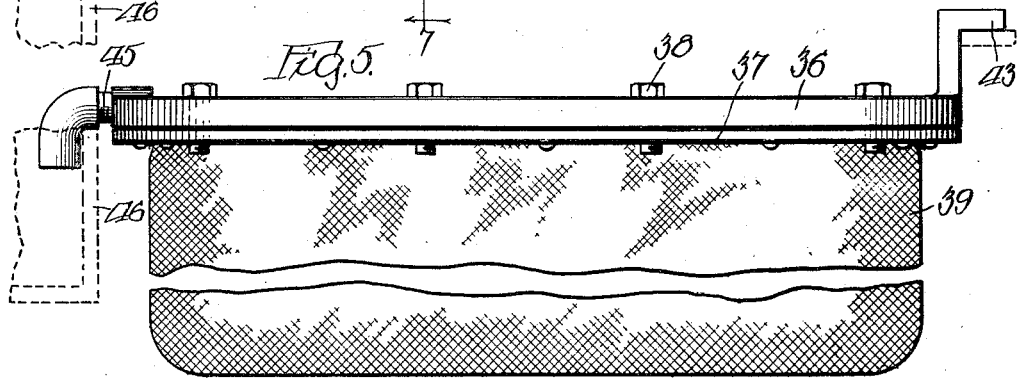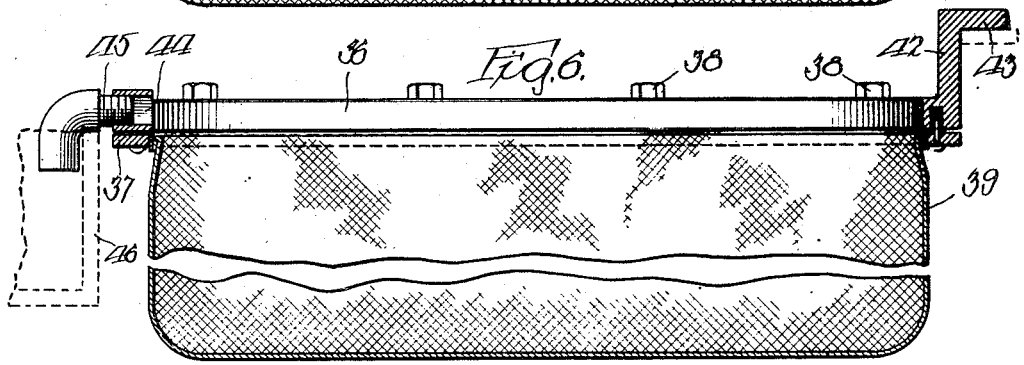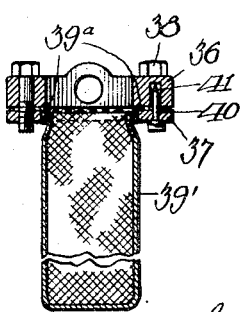

Patented Jan. 22, 1924.

1,481,525

UNITED STATES PATENT OFFICE.

WILLIAM W. NUGENT, OF CHICAGO, ILLINOIS.

OIL-PURIFYING MECHANISM.

Application filed February 23, 1918. Serial No. 218,643.

*To all whom it may concern:*

Be it known that I, WILLIAM W. NUGENT, a citizen of the United States, residing at Chicago, in the county of Cook and State of Illinois, have invented certain new and useful Improvements in Oil-Purifying Mechanism, of which the following is a specification.

My invention relates to apparatus for removing impurities from lubricating oil, and has for its object the provision of simple and efficient means for automatically separating water, dirt, and other foreign materials from lubricating oils.

A further object is the provision of a filter element provided with an automatic overflow preventing the contents of the filter element from spilling over the top of such element.

A further object is the provision of an open frame for filter elements with an overflow in the frame and a filter bag detachably connected to the frame.

A further object is the provision of a device of this character which has its parts easily accessible.

Other objects will appear hereinafter.

An embodiment of my invention is shown in the accompanying drawings, forming a part of this specification, and in which—

Fig. 1 is a front view of an oil purifying device embodying my invention and showing parts broken away to expose underlying portions.

Fig. 2 is an enlarged section taken on line 2—2 of Fig. 1.

Fig. 3 is a fragmental section taken on line 3—3 of Fig. 2.

Fig. 4 is a plan view of a filtering element used in the construction.

Fig. 5 is a side elevation of the same.

Fig. 6 is a central section of the same; and

Fig. 7 is a section taken on line 7—7 of Fig. 4.

Referring more particularly to the drawings, I have shown a casing or housing 10, which is provided with two substantially horizontal partitions 11 and 12, dividing the interior of the casing 10 into three chambers. The lower chamber 13 is a reservoir for the purified oil and also for housing the filtering elements. The intermediate section 14 is the chamber for washing and separating water from the oil, and the upper chamber 15 is for separating dirt and other foreign material from the oil. The chamber 15 is preferably considerably narrower than the chambers 14 and 13, so that the part of the chamber 14 which is not covered by the chamber 15 may be provided with an opening for gaining access to the interior of chamber 14.

The chamber 15 is provided with an opening in which a door 16 is used to cover such opening and provide means for gaining access to the interior of such chamber. The door 16 is preferaby hinged at a convenient point, such as at 17. In the unhinged portion of the top of chamber 15 are provided one or more openings 18, through which the oil to be purified is fed into the casing. The top of chamber 15 may be provided with a single door 16 extending substantially the full length thereof, or a plurality of shorter doors 16 disposed end to end, as desired.

In the chamber 15 and rising from the bottom thereof are two spaced perforated partitions 19 having a material 20, such as cotton fiber, or other fibrous material, substantially filling the space between such partitions. To one of the partitions 19 I preferably hinge a door 21 which covers the space between the partitions 19 and also the space between one of the partitions and a side of the chamber 15, so that oil and water passing out of the chamber 15 through the discharge opening 22 must pass through the perforated partitions 19 and fibrous material 20. When so desired, a plurality of openings 22 may be provided, substantially as indicated in Fig. 1. In each of the openings 22 I provide a pipe 23 which is designed to extend below the oil level in the chamber 14. The oil and water in passing through the partitions 19 and fiber 20 leaves practically all of the solid materials in the receiving compartment of chamber 15.

When the oil and water drops down into the chamber 14 they rise until the level reaches the overflowing points. Since oil is lighter than water and floats on such water, I provide an overflow for the water at a lower level than the overflow for the oil. In the chamber 14 I have shown a well 24 into which the water is adapted to discharge when it reaches a suitable level. When the well 24 has become filled with the water it passes out through pipe 25 and is conducted to a suitable place for its disposal. In the pipe 25 I preferably provide an observation window 26 through which an operator can see the water passing through pipe 25, when so desired.

In the chamber 14 I preferably provide a partition 27 which extends the full length of such chamber and has its upper edge above the oil level of such chamber and its lower edge spaced slightly above the bottom of such chamber. The partition 27 is designed to prevent the oil from being washed over the top of the well 24. It will be apparent that as the oil and water drop down through the openings 22, the oil will come to the top, and this partition will then prevent such oil from being washed over into well 24 as the water rises in the chamber 14. When the oil has raised until its level is higher than the top of the discharge pipe 28, such oil passes down through the pipe 28 from chamber 14.

In the chamber 14 I provide a heating element to warm up the oil and water in order to facilitate the oil being divided from the water. I have shown a heating element comprising steam pipes 29, but any other form of heater may be used, when so desired.

In the part of the top of chamber 14 which is not covered by chamber 15, I provide an opening which is closed by a door 30, hinged as at 31. The door 30 is provided so that the interior of chamber 14 may be inspected when desired. It is desirable that the door 30 be hinged back of the partition 27 so that access can be had to the back part of the chamber 14. The door 30 may be a single door extending substantially the length of chamber 14, or made up of a number of doors disposed end to end along the length of such chamber.

The discharge pipe 28 leading from the chamber 14 extends downwardly into the upper portion of chamber 13 and is provided with a header pipe 32. The header pipe preferably extends the full length of chamber 13 and is provided with caps 33 at its ends, so that upon removing the caps 33 sediment or dirt may be easily removed from such header pipe and without likelihood of such dirt being accidentally gotten into the purified oil in the bottom of chamber 13. Distributed along in the header pipe 32 are a plurality of drip valves 34. The valves 34 correspond in number to the number of filter elements 35 in the device, one filter element being positioned under each valve 34 to receive its supply of oil therefrom.

The filter elements are all substantially alike, and a description of one will suffice for all. At the top of each filter element is a frame made up of a top portion 36 and a bottom portion 37, secured together by cap screws 38, or their equivalent. The adjacent sides of the parts 36 and 37 are substantially parallel planes, so that the top edges of the filter bag 39 may be clamped between such sides. As a further means for preventing displacement of the top edges of the bags 39 from between the adjacent sides of the parts 36 and 37, I secure pins in one of the parts 36 or 37, preferably the lower part 37, which extend through the edges of the bag, as shown clearly in Fig. 7, and facilitate holding the edges of the bag between the parts of the filter frame. These pins 40 may be secured in the part 37 in any desirable manner. I have found that by making the pins snugly fit in holes which may be drilled through the parts 37, these pins will be securely held. In the part 36 I preferably drill or otherwise form recesses 41 larger than the pins 40, so that parts 36 and 37 may be easily separated, when so desired.

The filter bag 39 is preferably made up of two parts, one part 39′ forming the bag proper, and a plane part 39ᵃ having its outer edges corresponding to the outer edges of the frame and the central part thereof cut away, with the top edge of the bag part 39′ sewed to the inner periphery thereof. This construction provides a bag having its part between parts 36 and 37 substantially flat and easily held in position without having any tendencies to close the bag.

At one end of each of the filter frames I provide an arm 42 which reaches upwardly and has a flat toe portion 43 which rests on an angle bar 44. The angle bar 44 preferably extends throughout the length of the chamber 13, so that all of the filtering elements can be supported therefrom. The upwardly extending portions 42 and the flat toe portions 43 facilitate supporting the filter elements above their centers of gravity in order to facilitate holding the frames of the filter elements in substantial horizontal positions. The flat toe portions 43 also tend to prevent twisting or turning of the filter frames. By providing the upwardly extending hook 42 the rack or angle bar 44 may be located in an elevated position thus facilitating inspection of the filter elements when the door 48 is opened.

At the other end of each of the filter frames is an opening 44′ in which is fitted a downwardly curved pipe 45 forming a spout through which the oil will flow before it can flow over the top of the filter frame. The spout 45 also supports one end of the filter frame. The spout 45 rests on the edge of a trough 46 which is secured to the inner wall of the casing 10 and preferably at a lower level than the angle bar or ledge 44. The trough 46 preferably extends the full length of the chamber 13 and has a discharge opening 47 extending out of the casing, so that any oil which may pass from the interior of the frame before it has been filtered will pass out of the casing 10 and not overflow into the clean oil at the bottom of the chamber 13. The spout 45 is provided so that should the filter cloths become inoperative and not permit the oil to pass through them by reason of sediment, or otherwise, such unfiltered oil can be passed out of the device and again placed in the receiving opening 18. Each filter element is therefore independently mounted on longitudinal racks and each filter element is separately removable while the spouts 45 and the other filter elements resting on the racks remain in communication with the trough 46.

At the front side of the casing I provide an opening into the chamber 13 and cover such opening with a door 48. The door 48 preferably extends the full length of the chamber 13, so that when such door is open one can view all of the filter elements at one time. The door 48 is preferably hinged at its lower side at 49, so that when it is open it will drop down out of the way. The door and its opening are preferably situated at such a position that the upper edge of the opening will be above the angle bar or ledge 44, and its lower edge somewhat below such ledge or angle bar. This arrangement provides means whereby an operator can see both the top and sides of the filter elements at the same time. In order to facilitate observing the filter bags I provide an illuminating means, such as an electric lamp 50.

At one of the ends of the oil purifying casing, I prefer to provide openings such as those shown at 51, 52, 53 and 54. The openings 51 and 53 are overflow openings for the respective chambers 15 and 13. Near one end of the chamber 15 I provide an upright partition 55 of substantially the same height as the upright partitions 19, which latter have their ends secured to the partition 55 and extend nearly the entire length of the chamber 15, as shown in Fig. 1. When the chamber 15 back of the perforated partition 19 overflows the partition 55, the material enters an auxiliary chamber 51' which is provided with the overflow opening 51. The chamber 14 is provided with a cleaning opening 52 which may normally be closed by means of a cap. When the cover 30 is opened, the sediment on the bottom 11 of the chamber 14 may be scraped toward the cleaning opening 52, from which the sediment will flow when the cap of the opening 52 is removed. During such cleaning operation, the pipe 28 and the structure comprising the well 24 and the baffle plate 27, will not interfere with movements of the scraping tools, as such pipe 28 and baffle plate structure occupy only a small space, as shown in Fig. 1.

The lower chamber 13 which contains the purified oil, is provided with an outlet opening 54 connected to the apparatus where the purified oil is desired. In the upper portion of the chamber 13, I provide an overflow opening 53 near the lower ends of the bags 39.

It should also be noted that the door 48, preferably extending the full length of the apparatus, is so located or hinged along an edge 49 of the chamber 13, that the opening for the removal of the bags will be ample in elevation to permit the removal of each bag while completely full of oil. It will be seen from this arrangement that the filtering bags may be used until overflow is indicated at the discharge opening 47 at one end of the oil purifying structure. When the bag which is overflowing is found, it should be removed for cleaning, because the overflow indicates that the accumulated dirt or sediment in the bag has become too great to permit normal filtering. While in some instances the flow into such filled bag from the nozzle 34 immediately above the same may be cut off and the filtering at a very slow rate permitted to proceed until the bag can be more easily removed, I prefer to provide the front portion of the casing 10 with a door opening of a sufficient height to permit the free removal of the bag filled with oil, and without spilling the unfiltered oil into the lower portion of the casing 10. This may readily be done by lifting the curved pipe 45 from its seat on the upper edge of the trough or rack 46 and lifting the hanger 42 from the shelf or rack 44, whereupon by proper movement of the frame 35 the hanger 42 may be brought under the shelf 44 and then moved upwardly a sufficient distance to give the bolt heads a sufficient clearance under the shelf 44, while the lower edge of the bag will have sufficient clearance over the bottom edge of the door opening. In some instances, an auxiliary bag may be used on the interior of the bag 39 and removably connected to the frame 35 by means of another frame, so that when the two bags are hanging in filtering position, the upper edges of each will be in substantially the same horizontal plane, and both in position to permit overflow through the curved pipe 45. This arrangement will permit quicker removal because a new inner bag may replace the removed inner bag and the same bag 39 used again without cleaning until after further use. The door 48 is preferably hinged so as to remain open by its own weight, and may be held in closed position by any suitable means, such as the clasp 56 pivoted at 57 to the exterior of the casing and moved to the dotted line position 58 when the door is to be opened. It should also be noted that the spout 45 is in the form of a hook fitting over the edge of the trough 46 and therefore the proper fitting of the filter elements in place will be facilitated.

No claim is made in this application to the casing, the arrangement of the filter elements in the casing, nor the water separating mechanism shown and described. These features are claimed in my co-pending application for oil purifying mechanism, Serial No. 426,970, filed November 29, 1920.

Obviously those skilled in the art may make various changes in the details and arrangement of parts without departing from the spirit and scope of my invention as defined by the claims hereto appended, and I therefore wish it to be understood that I do not desire to be restricted to the exact construction herein disclosed.

I claim:

1. A filter element comprising a frame formed in two parts and secured together, one of the parts having an overflow opening below its top edge; a filter bag having its top edge clamped between the parts of said frame; and points on one of the parts engaging the top portion of the filter bag preventing displacement of the bag top from between said parts.

2. A filter element comprising a frame formed of two horizontally disposed rings, there being an overflow opening in the upper ring; a filter bag having its upper open end disposed between said rings; and means securing the rings and filter bag top together.

3. A filter element comprising a frame formed in two substantially horizontal parts and secured together with their adjacent sides in substantially parallel planes and an overflow means in the uppermost of said parts, a filter bag made up of two parts, one part being a substantially plane piece having its outer edges conforming with the frame and its central portion cut away, and the other part forming a bag with its top edge secured to the inner edges of the plane piece, said overflow opening being disposed above the top of said filter bag and means clamping said plane part of the filter bag between the parts of the frame.

4. A filter element comprising a substantially horizontal frame having its top open; a filter bag having its top edges secured to the filter frame with the interior of the frame communicating with the interior of the bag; and an overflow pipe communicating with the interior of the frame providing an overflow for the filter element and preventing fluids running over the top of the latter.

5. A filter element comprising a frame formed of two horizontally disposed ring members with substantially alined vertical openings therethrough; a filter bag made up of a substantially flat part disposed between said members with an opening registering with said vertically alined openings and a bag proper secured at its top to said flat part, there being an overflow opening in said frame above the top of said filter bag; and means holding the flat part of the filter bag and said ring members together.

6. A filter apparatus comprising two substantially horizontal ring members; a flat bag part secured between said ring members; and a bag proper having its top edge secured to said flat part, the uppermost of said rings having a discharge means therein above the top of the bag.

7. A filter element comprising a substantially horizontal frame; a downwardly curved overflow spout attached to one portion of said frame; a filter bag attached to and depended from said frame; and an upwardly extending hanger arm attached to said frame and having its supporting object engaging surface considerably above the top of said frame so as to permit observation of said frame underneath the bottom of said supporting object.

In testimony whereof I have signed my name to this specification on this 19th day of February A. D. 1918.

WILLIAM W. NUGENT.